US006427807B1

(12) United States Patent
Henneau

(10) Patent No.: US 6,427,807 B1
(45) Date of Patent: Aug. 6, 2002

(54) METHOD AND APPARATUS FOR CONFIGURING ELEVATOR CONTROLS

(75) Inventor: Philippe Henneau, Lucerne (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/703,773

(22) Filed: Nov. 1, 2000

(30) Foreign Application Priority Data

Nov. 11, 1999 (EP) .............................................. 99811035

(51) Int. Cl.[7] .............................................. G05B 15/00
(52) U.S. Cl. ..................... 187/247; 187/391; 187/413
(58) Field of Search ............................... 187/247, 248, 187/391, 393, 413

(56) References Cited

U.S. PATENT DOCUMENTS

| 4,509,143 A | * | 4/1985 | Tajima et al. ............. 187/29 R |
| 4,622,551 A | * | 11/1986 | Kupersmith et al. ... 340/825.06 |
| 4,690,243 A | * | 9/1987 | Ichioka ....................... 187/101 |
| 4,860,207 A | * | 8/1989 | Kubo ........................... 187/124 |
| 4,872,532 A | * | 10/1989 | Tobita et al. ............... 187/121 |
| 5,352,857 A | * | 10/1994 | Ovaska ....................... 187/247 |
| 5,357,064 A | * | 10/1994 | Boyce et al. ............... 187/247 |
| 5,383,535 A | * | 1/1995 | Ando ........................... 187/247 |
| 6,173,814 B1 | * | 1/2001 | Herkel et al. ............... 187/288 |

* cited by examiner

Primary Examiner—Jonathan Salata
(74) Attorney, Agent, or Firm—MacMillan, Sobanski & Todd, LLC

(57) ABSTRACT

A method of and an apparatus for configuring elevator controls permit external signal emitters and signal receivers to be connected to freely selectable connection points of an input/output module. For each of the occupied connection points on the input/output module at least one programmable connection configuration module can be assigned which delivers to the control processor via a bus system the requisite information concerning the type and function of the signal emitter or signal receiver connected to the corresponding connection point.

18 Claims, 2 Drawing Sheets

METHOD AND APPARATUS FOR CONFIGURING ELEVATOR CONTROLS

BACKGROUND OF THE INVENTION

The present invention relates to a method of and an apparatus for configuring elevator controls that consists in essence of a control processor, an input/output module with connection points for decentralized signal emitters and signal receivers, and of these signal emitters and signal receivers themselves.

Controls of elevator installations have connected to them a large number of different external signal emitters and signal receivers whose function and number is often not yet definitely fixed at the time of their configuration at the place of manufacture. For example, the number of floors to be served, together with the necessary call buttons, displays, landing switches, etc., can be subsequently increased, or the customer wishes to have additional control-dependent safety measures, or new regulations require changes to control functions. It is usual for defined input or output signals from the control processor to be assigned to defined connection points on an input/output module, and modification to these assignments to be possible only with substantial cost and risk of error.

The U.S. Pat. No. 4,490,775 shows a "universal programmable interface" that allows the free assignment of terminal connectors on a circuit board to plug-type contacts which take the form of conductors arranged on both sides of the same circuit board and are connected, for example, to the inputs and outputs of a microprocessor. The terminal contacts as well as the plug-type contacts are led by means of conductors, also on both sides of the circuit board, to the supports penetrating the circuit board. Mutual assignment of one terminal contact to one plug-type contact in each case is effected by placing a wire bridge between the two supports connected to them.

With this method it is necessary for a person who has to make on-site changes or additions to the control, and the corresponding assignment of connection points to inputs and outputs of a control, to have corresponding technical knowledge and knowledge of schematic wiring diagrams. Furthermore, the work is time-consuming and causes the elevator to be out of service for a correspondingly long time because when making modifications on site mistakes are also frequently made.

SUMMARY OF THE INVENTION

The present invention concerns a method of configuring elevator controls which permits rapid and error-free assignment of input and output signals of a control processor to freely selectable connection points of external signal emitters and signal receivers, such as limit switches, sensors, display devices, alarm signals, etc., without requiring special knowledge of controls, without wiring modifications having to be made, and without the control processor having to be reprogrammed on site.

According to the present invention, these characteristics are achieved in an elevator control by means of a configuration method that allows the external signal emitters and signal receivers to be connected to freely selectable connection points arranged on an input/output module, in that assigned to each occupied connection point is at least one programmable, preferably plug-type, connection configuration module that delivers to the control processor the requisite information concerning the type and function of the signal emitter or signal receiver connected to the corresponding connection point.

With the method according to the present invention, important advantages are achieved. It allows fast and error-free configuration of an elevator control by persons who have no special knowledge of control and programming technology. On-site adaptations of the connection configuration to modified or additional signal emitters and signal receivers resulting from installation-specific peculiarities, local safety regulations, or post-installation extensions or modifications to the elevator installation, require neither time-consuming interventions in wiring nor program changes in the control processor. Such adaptations can also be implemented by persons without profound knowledge of controls and programming by using the method to connect the new signal emitters and signal receivers to freely selectable connection points and install the configuration modules programmed at the place of manufacture corresponding to the related functions in the corresponding places provided, preferably by plugging the modules into receptacles. This practically rules out connection errors and programming errors, thereby avoiding unnecessary out-of-service times of the elevator installation.

Moreover, with this method, unused connection points and the corresponding space provided for them are saved because they need only be present for the number of signal emitters and signal receivers actually installed, and there is no need to have permanently assigned connection points for the maximum possible number of every different device and every different function.

In a preferred embodiment of the method and apparatus according to the present invention, the flow of information between the connection configuration modules arranged on the input/output module and the control processor takes place via a suitable bus system. The bus system forms a simple communication connection between a large and variable number of configuration modules and the control processor, it being possible for the latter also to be part of a decentralized elevator control system subordinated to a main processor. Each configuration module has programmed into it a bus address that is unambiguous and unique for every function of a signal emitter or signal receiver represented by the module.

According to a further embodiment of the present invention, the aforementioned bus system can have coupled to it programmed instruction configuration modules that deliver installation-specific instructions to the control processor. Such information relates, for example, to peculiarities of an elevator installation that are not definitely known at the time of programming the control processor at the place of manufacture, or to processes and data which are subject to subsequent change through being dependent on country-specific regulations, building modifications, improvements in convenience, climatic conditions, etc. With such a system, maximum possible flexibility is achieved for an elevator control that in its core is standardized, thereby avoiding outlay and risk of error for reprogramming.

It is preferable to use as configuration modules memory chips or processor chips that are commercially available without difficulty and can be programmed by usual means.

Special advantages are achieved with the proposed system in that the control processor is programmed at the place of manufacture for a large number of control variants which for the delivered version of an elevator are not yet used, but for which it can be regarded as probable that they will be necessary in the more distant future. Should they subsequently become necessary, such control variants are automatically activated by coupling to the aforementioned bus system corresponding configuration modules with the necessary connection points for signal emitters or signal receivers. This method makes it possible for elevator specialists with no special knowledge of control or programming technology to adapt control functions without error and with minimal out-of-service times.

The one connection configuration method has the advantage that memory chips can be used for the connection configuration modules which are relatively simple and available from a large number of suppliers.

The other connection configuration method is based on the application of so-called "addressable switches" with integral data storage which are connected to the control processor via a bus system, and to the corresponding connection point via a directly connecting conductor. In this manner, these connection configuration modules firstly deliver to the control processor stored information about the type and function of the signal emitters and signal receivers connected to the corresponding connection points, and secondly can be caused by the control processor via the bus to generate via the directly connecting conductor an output signal on the corresponding connection point, or to detect a signal present there and communicate it via the bus to the control processor. With this method, there is no need on the control processor for separate inputs and outputs with related conductors connecting them to the connection points, as a result of which a particularly simple and clear system is achieved.

It is preferable for the configuration modules to take the form of plug-type units that can be plugged into receptacles arranged on the input/output module and connected to the control processor via the bus system. Clear markings on the input/output module, which usually takes the form of a printed circuit, indicate the assignment of the connection configuration module receptacles to their corresponding connection points. This embodiment of the invention makes it possible to install or replace the configuration modules in minimal time and with very low risk of error.

Application is facilitated further by the configuration modules being marked with abbreviations that symbolize the control function for which they deliver programmed instructions. Signal emitters and signal receivers to be connected are also marked with the corresponding abbreviations.

A significant simplification of the administration and updating of the installation documentation is achieved in that, based on the assignment of the plugged-in connection configuration modules to the corresponding connection points, as well as based on the instructions programmed in these and in the plugged-in instruction configuration modules, the control processor delivers the requisite data for printing a schematic wiring diagram which documents the connection configuration actually present and the specific conditions defined by means of instruction configuration modules.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a schematic block diagram of another embodiment of the input/output module in accordance with the present invention with "addressable switches" as connection configuration modules, on which these connection configuration modules, which are controlled by the control processor via a bus system, themselves generate signals to external signal receivers and receive signals from external signal emitters and pass them on.

DESCRIPTION OF THE PREFERRED EMBODIMENT

Figure 1:
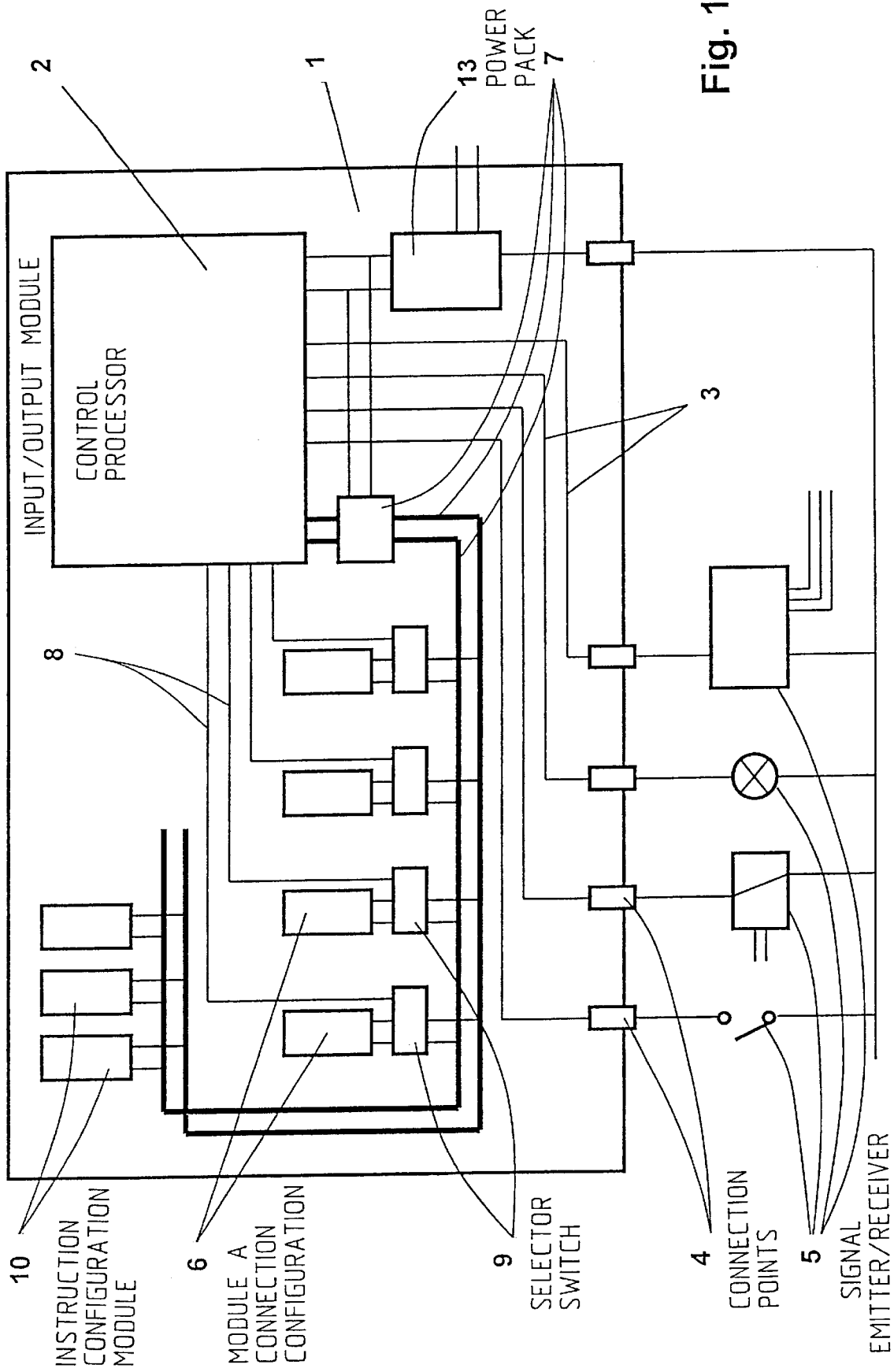
FIG. 1 is a schematic block diagram of an input/output module and control processor for an elevator control in accordance with the present invention with connection configuration modules on which the connection points are connected directly to inputs and outputs f the control processor.

FIG. 1 shows diagrammatically an input/output module 1 of an elevator control that takes the form of a printed circuit board on which an elevator control processor 2 is integrated. This processor 2 could, of course, also be mounted on a separate module. Visible at the lower edge of the input/output module I are connection points 4 that are connected individually via connecting conductors 3 to the inputs and outputs of the control processor 2 and to which external signal emitters and signal receivers 5 are connected. Assigned to each of these connection points 4 is a programmable connection configuration module A 6 that is connected via a bus system 7 to the control processor 2 and which contains programmed information and instructions relating to the signal emitters or signal receivers 5 connected to the corresponding connection points 4. With the assistance of selector switches 9, the control processor 2 can activate or deactivate the associated connection configuration module A 6 via selector conductors 8. Also connected to the conductors of the same bus system 7, and thereby also to the control processor 2, are programmable instruction configuration modules 10 which have integral programmable data storage. The configuration modules 6 and 10 include separable plug receptacles mounted on the circuit board into which the module circuits are plugged. For completeness, a power pack 13 is provided with a connection for supplying power to the control processor 2 and the bus system 7.

The configuration method according to the present invention functions with the components shown in FIG. 1 in the following manner. On initialization of the elevator control, as a first step the control processor 2 generates a reset command on the bus system 7 connecting the configuration modules 6 and 10 which causes all the configuration modules mounted on the input/output module 1 to communicate their addresses via the bus system to the control processor. The control processor 2 registers these addresses. In a second step, the control processor 2 activates via the aforementioned selector conductors 8, and the selector switches 9, each connection configuration module A 6 in turn, and in each case simultaneously initiates an identification command on the bus system 7. Whereupon the connection configuration module A 6 activated in each case again communicates its address to the control processor 2, which from it recognizes the assignment of this connection configuration module to the corresponding connection point 4 and thereby to the signal emitter or signal receiver 5 connected to it. The control processor 2 registers this assignment together with the instructions stored in the connection configuration module A 6. In a last initialization step, the installation-specific instructions contained in the instruction configuration module 10 are read into the control processor 2 via the bus system 7.

Figure 2:
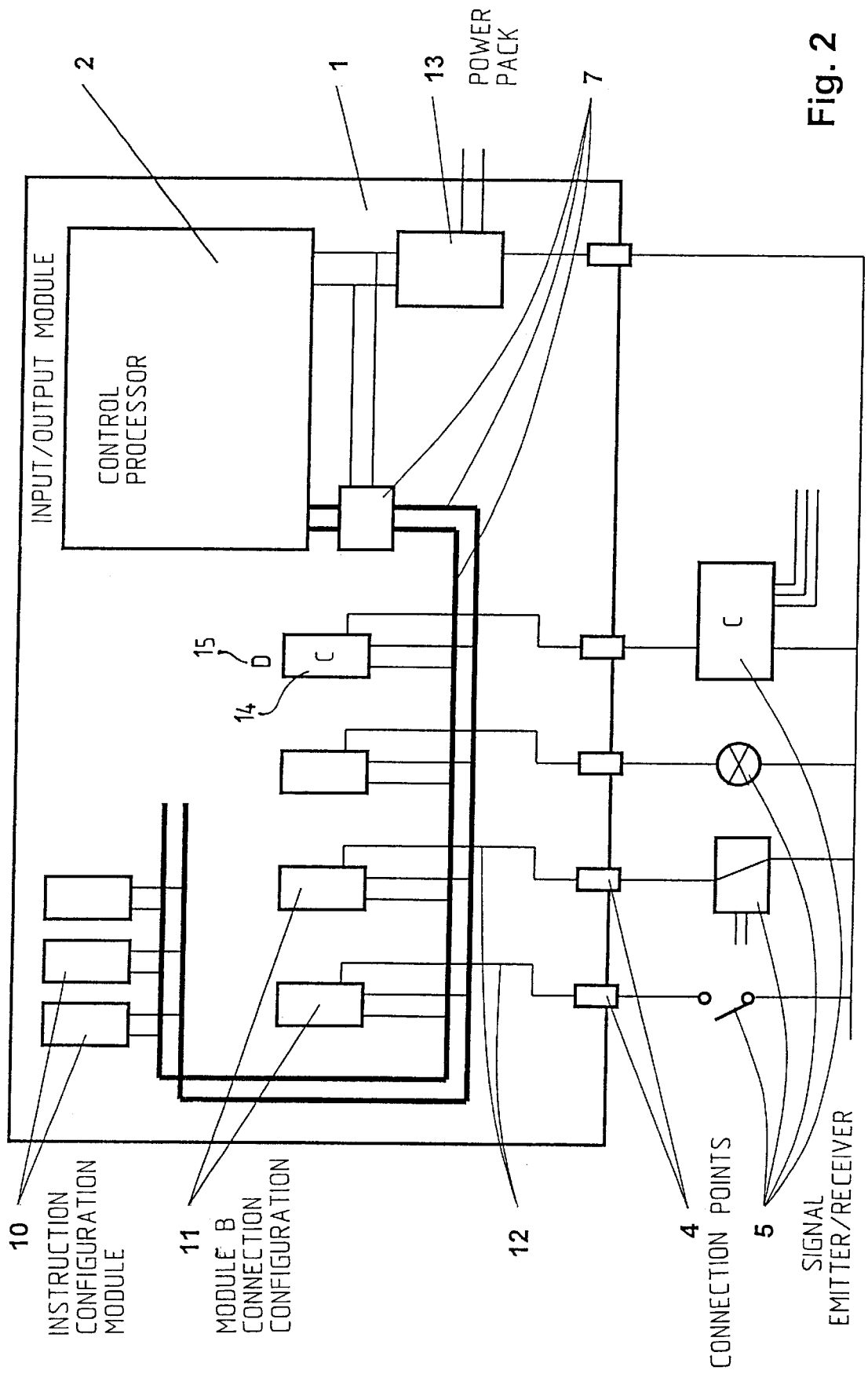

FIG. 2 shows an input/output module 21, which in essence has the same components as the module 1 described in FIG. 1 and also makes possible the same method of configuring elevator controls. Here, however, the configuration modules A 6 are replaced by programmable connection configuration modules B 11 that are plugged into associated plug receptacles on the circuit board. The modules 11 are commercially available so-called "addressable switches" with integral programmable data storage which are also connected to the control processor 2 via a bus system 7. Such a connection configuration module B 11, when caused to do so by the control processor 2 via the bus system 7, is able via a directly connecting conductor 12 to generate an output signal on the corresponding connection point 4 or to detect a signal present there and communicate it via the bus system 7 to the control processor 2. Here, in contrast to the method explained by reference to FIG. 1, on initialization of the elevator control no assignment of connection configuration modules and signal emitters or signal receivers to specific inputs or outputs of the control processor 2 is necessary, since the signals of this device travel over the connection configuration modules B 11 assigned to each connection point, and over the bus system 7, and are identified by means of the respective bus addresses. On initialization of the elevator control, the programmed data stores of the connection configuration modules B 11 also deliver to the control processor 2 via the bus system 7 programmed information and instructions concerning the signal emitters or signal receivers 5 connected to the corresponding connection points 4. The input/output module 21 described here also has connected to it the instruction configuration modules 10 on the bus system 7 which contain in their programmable data stores installation-specific information and instructions which are called up and stored by the control processor 2 when the elevator control is initialized.

The configuration modules 6, 10 and 11 can plug-type units that can be plugged into receptacles arranged on the input/output module circuit board and connected to the control processor 2 via the bus system 7. Clear markings on the input/output module circuit board, such as the letter "D" 15 indicate the assignment of the connection configuration module receptacles to their corresponding connection points 4. This embodiment of the invention makes it possible to install or replace the configuration modules in minimal time and with very low risk of error.

Installation and replacement is further facilitated further by the configuration modules being marked with abbreviations which symbolize the control function for which they deliver programmed instructions. For example, the letter "C" 14 shown on one of the modules 11. The signal emitters and the signal receivers 5 to be connected are also marked with the corresponding abbreviations.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of configuring an elevator control comprising the steps of:
   a. providing a control processor for controlling an elevator system;
   b. providing an input/output module having a plurality of connection points connected to the control processor for connecting to decentralized signal emitters and signal receivers of the elevator system;
   c. providing a plurality of programmable connection configuration modules in the input/output module, each of the connection configuration modules being connected to the control processor;
   d. assigning each of the connection configuration modules to an associated one of the connection points; and
   e. generating to the control processor from each of the connection configuration modules requisite information concerning a type and a function of a one of the signal emitters and the signal receivers when connected to the associated connection point.

2. The method according to claim 1 wherein the connection configuration modules are connected to the control processor by a bus system for transferring the requisite information and the control processor is configured to be part of a decentralized elevator control system subordinated to a main processor.

3. The method according to claim 2 including at least one programmable instruction configuration module connected to the bus system for generating installation-specific instructions to the control processor.

4. The method according to claim 3 wherein the configuration modules contain at least one programmable chip storing information that can be retrieved by the control processor.

5. The method according to claim 3 including prior to connection of the control processor to the elevator system, programming the control processor to process additional requisite information representing a type and function of signal emitters and signal receivers that can be added to the elevator system in the event of subsequent extensions or modifications to the elevator system, and providing on the input/output module unassigned connection points for connection to later installed additional programmable connection configuration modules.

6. The method according to claim 3 including generating from the control processor data for printing a schematic wiring diagram based on the assignment of the connection configuration modules to the corresponding connection points, as well as based on the information stored in the connection configuration modules and in the instruction configuration module, the data representing the connection configuration actually present and the specific conditions defined by the instruction configuration module.

7. The method according to claim 2 including providing between each of the connection configuration modules and the bus system a selector switch for activating and deactivating an associated one of the connection configuration modules by the control processor.

8. The method according to claim 7 including a separate selector conductor connected between the control processor and an associated one of the selector switches.

9. The method according to claim 8 including initializing the elevator control by generating from the control processor a reset command on the bus system to cause the configuration modules to communicate associated bus addresses via the bus system to the control processor, then causing the control processor to briefly activate via the selector conductors each of the connector configuration modules in turn and simultaneously generate an identification command on the bus system, whereupon each of the connection configuration modules when activated again sends the associated bus address to the control processor which recognizes from the bus address the assignment of the connection configuration module to one of the inputs and outputs of the control processor and registers this assignment together with the information stored in the connection configuration module regarding the connected one of the signal emitters and signal receivers.

10. The method according to claim 2 wherein the connection configuration modules are addressable switches with integral data storage and are each connected by an associated connecting conductor to one of the connection points, and including initializing the elevator control by generating from the connection configuration modules to the control processor stored information concerning the type and function of the signal emitters and signal receivers connected to the corresponding contact points, and then causing the control processor to generate via the direct connection conductor one of an output signal at the corresponding connection point and a signal present at the corresponding connection point.

11. The method according to claim 1 including plugging the connection configuration modules into plug receptacles on the input/output module, the assignment of the plug receptacles to corresponding ones of the connection points being identifiable by means of markings provided on the input/output module.

12. The method according to claim 1 wherein each function for which a signal emitter or a signal receiver can be connected is symbolized by an abbreviation, and that each of the connection configuration modules is designated by the abbreviation that corresponds to that control function for which the module is programmed.

13. An elevator control comprising:
a control processor for controlling an elevator system;
an input/output module having a plurality of connection points connected to said control processor for connecting to decentralized signal emitters and signal receivers of the elevator system; and
a plurality of programmable connection configuration modules in said input/output module each being connected to said control processor, each said connection configuration module being assigned to an associated one of said connection points, whereby when one of a signal emitter and a signal receiver is connected to one of said connection points, said connection configuration module assigned to said one connection point generates to said control processor requisite information concerning a type and a function of said one of a signal emitter and a signal receiver.

14. The elevator control according to claim 13 including a bus system connected between said connection configuration modules and said control processor for transferring the requisite information, said control processor being configured to be part of a decentralized elevator control system subordinated to a main processor.

15. The elevator control according to claim 13 including at least one programmable instruction configuration module connected to said control processor for generating installation-specific instructions to said control processor.

16. The elevator control according to claim 13 wherein said control processor is programmed to process requisite information representing a type and function of signal emitters and signal receivers that can be added to the elevator system in the event of subsequent extensions or modifications to the elevator system, and said plurality of connection points includes at least one unassigned connection point for connection to later installed additional programmable connection configuration modules.

17. The elevator control according to claim 13 including a plurality of selector switches each connected between an associated one of said connection configuration modules and said control processor for activating and deactivating said associated one of said connection configuration modules by said control processor.

18. A method of configuring an elevator control comprising the steps of:
a. providing a control processor for controlling an elevator system, the control processor being configured to be part of a decentralized elevator control system subordinated to a main processor;
b. providing an input/output module having a plurality of connection points connected to the control processor for connecting to decentralized signal emitters and signal receivers of the elevator system;
c. providing a plurality of programmable connection configuration modules in the input/output module, each of the connection configuration modules being connected to the control processor by a bus system for transferring information, the connection configuration modules being addressable switches with integral data storage and each being connected by an associated connecting conductor to one of the connection points;
e. assigning each of the connection configuration modules to an associated one of the connection points;
f. generating to the control processor from each of the connection configuration modules requisite information concerning a type and a function of a one of the signal emitters and the signal receivers when connected to the associated connection point; and
g. initializing the elevator control by generating from the connection configuration modules to the control processor stored information concerning the type and function of the signal emitters and signal receivers connected to the corresponding contact points, and then causing the control processor to generate via the direct connection conductor one of an output signal at the corresponding connection point and a signal present at the corresponding connection point.

* * * * *